United States Patent
Iwashita et al.

(10) Patent No.: US 8,743,395 B2
(45) Date of Patent: Jun. 3, 2014

(54) IMAGE FORMING APPARATUS, IMAGE FORMING SYSTEM, PROCESSING METHOD, AND COMPUTER READABLE MEDIUM

(75) Inventors: Hideharu Iwashita, Saitama (JP); Takeshi Yokoe, Saitama (JP); Tsuyoshi Tooda, Saitama (JP); Takayoshi Suzuki, Saitama (JP); Atsushi Mori, Saitama (JP); Katsue Komaki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 859 days.

(21) Appl. No.: 12/795,153

(22) Filed: Jun. 7, 2010

(65) Prior Publication Data

US 2011/0102832 A1    May 5, 2011

(30) Foreign Application Priority Data

Nov. 5, 2009    (JP) ................................. 2009-253922

(51) Int. Cl.
  *G06F 3/12*   (2006.01)
  *G06K 15/00*   (2006.01)
(52) U.S. Cl.
  USPC .................... 358/1.15; 358/1.14; 358/1.16
(58) Field of Classification Search
  None
  See application file for complete search history.

(56) References Cited

U.S. PATENT DOCUMENTS

| | | | |
|---|---|---|---|
| 6,693,717 B1* | 2/2004 | Teradaira et al. | 358/1.14 |
| 2001/0046065 A1* | 11/2001 | Furukawa et al. | 358/1.15 |
| 2002/0080390 A1 | 6/2002 | Ogura | |
| 2004/0207860 A1* | 10/2004 | Kurihara | 358/1.2 |
| 2005/0113025 A1* | 5/2005 | Akamatsu et al. | 455/41.3 |
| 2005/0135829 A1* | 6/2005 | Miyazaki | 399/80 |
| 2008/0170584 A1* | 7/2008 | Shoji | 370/449 |
| 2008/0187346 A1* | 8/2008 | Kato | 399/83 |
| 2009/0268234 A1* | 10/2009 | Furuya | 358/1.15 |
| 2009/0279133 A1* | 11/2009 | Nakatsuka | 358/1.15 |
| 2013/0050761 A1* | 2/2013 | Nakagiri et al. | 358/1.15 |

FOREIGN PATENT DOCUMENTS

| | | |
|---|---|---|
| JP | A-2001-285519 | 10/2001 |
| JP | A-2001-290397 | 10/2001 |
| JP | A-2002-125109 | 4/2002 |
| JP | A-2006-078904 | 3/2006 |
| JP | A-2006-88479 | 4/2006 |
| JP | A-2008-102598 | 5/2008 |
| JP | A-2008-205850 | 9/2008 |
| JP | A-2008-265100 | 11/2008 |

OTHER PUBLICATIONS

Jul. 9, 2013 Office Action issued in Japanese Patent Application No. JP2009-253922 (with English Translation).

* cited by examiner

*Primary Examiner* — Satwant Singh
(74) *Attorney, Agent, or Firm* — Oliff PLC

(57) ABSTRACT

An image forming apparatus includes a communication unit, a prohibition unit, an execution unit, and a control unit. The communication unit communicates with an external apparatus. The prohibition unit prohibits the communication unit from communicating with the external apparatus when a command for executing initialization with respect to the image forming apparatus is specified. The execution unit executes a process for accepting set information of the initialization when the prohibition unit prohibits the communication unit from communication with the external apparatus. The control unit executes a process for informing that the initialization should be executed when an elapsed time of a waiting state where input of the set information is not executed exceeds a given period.

8 Claims, 15 Drawing Sheets

IMAGE FORMING APPARATUS, IMAGE FORMING SYSTEM, PROCESSING METHOD, AND COMPUTER READABLE MEDIUM

CROSS-REFERENCE TO RELATED APPLICATIONS

This application is based upon and claims priority under 35 USC 119 from Japanese Patent Application No. 2009-253922, filed Nov. 5, 2009.

BACKGROUND

1. Technical Field

This invention relates to an image forming apparatus, an image forming system, a processing method, and a computer readable medium.

2. Related Art

Some image forming apparatus have a plurality of functions of a fax function, a scan function, a print function, etc., (the apparatus is called multiple function device). The image forming apparatus (multiple function device) having a plurality of functions has a setup wizard function for smoothly executing initialization in response to the environment in which the image forming apparatus is installed. The user sets the setup values of set items involved in initialization in an interactive mode using the setup wizard function.

SUMMARY OF THE INVENTION

According to an aspect of the invention, an image forming apparatus includes a communication unit, a prohibition unit, an execution unit, and a control unit. The communication unit communicates with an external apparatus. The prohibition unit prohibits the communication unit from communicating with the external apparatus when a command for executing initialization with respect to the image forming apparatus is specified. The execution unit executes a process for accepting set information of the initialization when the prohibition unit prohibits the communication unit from communication with the external apparatus. The control unit executes a process for informing that the initialization should be executed when an elapsed time of a waiting state where input of the set information is not executed exceeds a given period.

BRIEF DESCRIPTION OF THE DRAWINGS

Exemplary embodiments of the invention will be described in detail based on the following figures, wherein.

DETAILED DESCRIPTION

Figure 1:
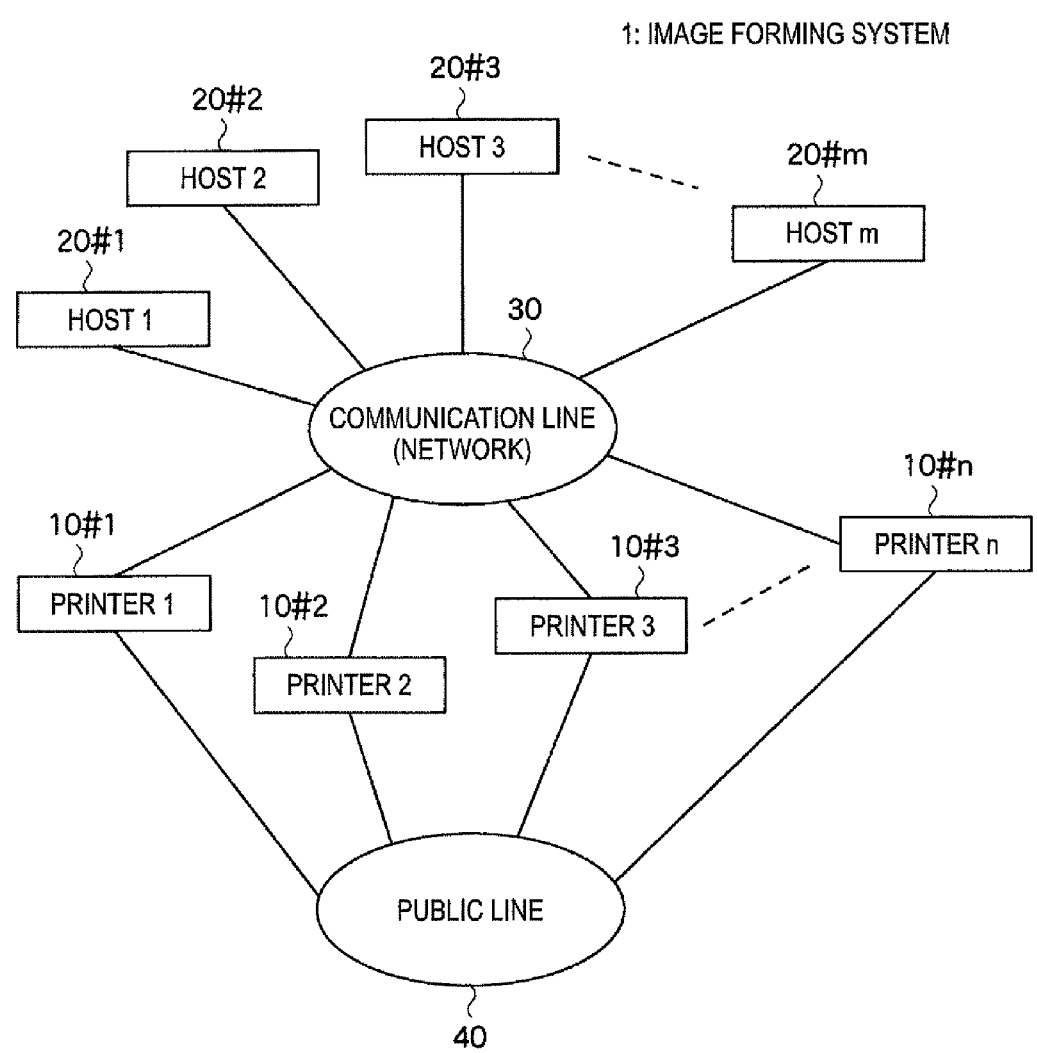
FIG. 1 is a configuration drawing to show the configuration of an image forming system according to a first exemplary embodiment of the invention.

Exemplary embodiments as examples of the invention will be discussed below in detail based on the accompanying drawings: In the drawings to describe the exemplary embodiments, the same components are denoted by the same reference numeral as a rule and will not be discussed again.

First Embodiment

The configuration of an image forming system according to a first embodiment will be discussed with reference to FIG. 1.

An image forming system 1 has a plurality of (n) printers 10#1, 10#2, 10#3, . . . 10#n and a plurality of (m) host computers (simply, hosts) 20#1, 20#2, 20#3, 20#m, which are connected through a communication line 30 as shown in FIG. 1. The printers 10#1, 10#2, 10#3, . . . 10#n are connected through a public line 40 of an ISDN network, a PSTN network, etc.

The printers 10#1 to 10#n function as image forming apparatus and have each a plurality of functions of a fax function, a scan function, a print function, etc. Each of the printers 10#1 to 10#n communicates with external apparatus of another printer, the host, etc. The printers 10#1 to 10#n are collectively called printer 10.

The hosts 20#1 to 20#3 function as communication apparatus and transfers information by communicating with any desired one of the printers.

As the communication line 30, a wired communication line of a local area network (LAN), a telephone line, etc., a wireless communication line of a wireless LAN, etc., further a combination of the communication lines, etc., may be named. In the first embodiment, a network is adopted as the communication line 30.

Figure 2:
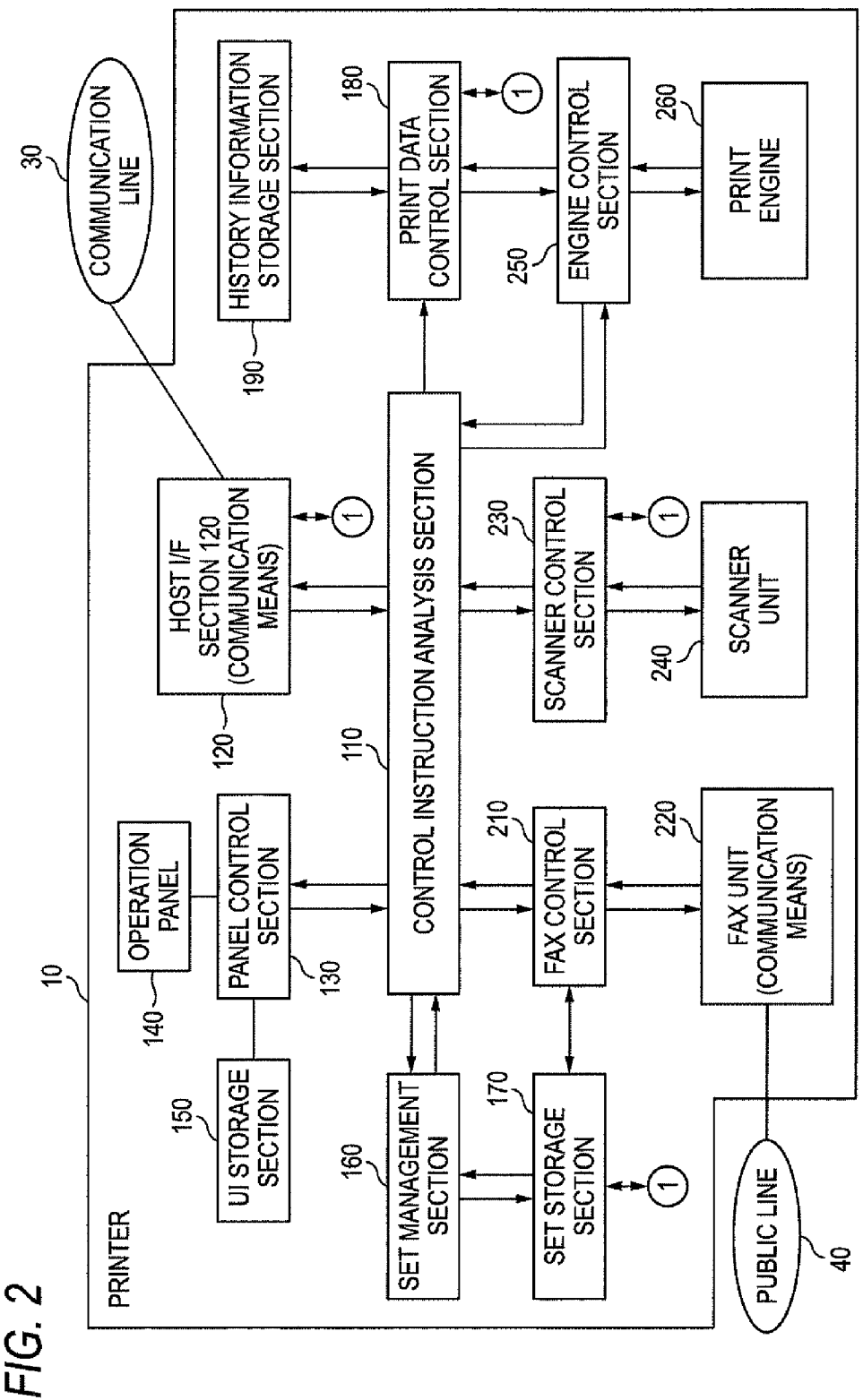
FIG. 2 is a block diagram to show the function configuration of a printer according to the first exemplary embodiment of the invention.

The printer 10 has a control instruction analysis section 110, a host I/F section 120, a panel control section 130, an operation panel 140, a UI storage section 150, a set management section 160, a set storage section 170, a print data control section 180, a history information storage section 190, a FAX control section 210, a FAX unit 220, a scanner control section 230, a scanner unit 240, an engine control section 250, and a print engine 260, as shown in FIG. 2.

The control instruction analysis section 110 analyzes communication information (processing request, etc.) received from the host I/F section 120 or input information (processing request, etc.) received from the panel control section 130, and controls the set management section 160, the print data control section 180, the FAX control section 210, the scanner control section 230, and the engine control section 250 in response to the analysis result.

The host I/F section 120 has a communication means function and communicates with an external apparatus, for example, the host through the communication line 30. It receives communication information from the host, outputs the communication information to the control instruction analysis section 110, and transmits transmission information from the control instruction analysis section 110 to the host of the destination.

Figure 3:
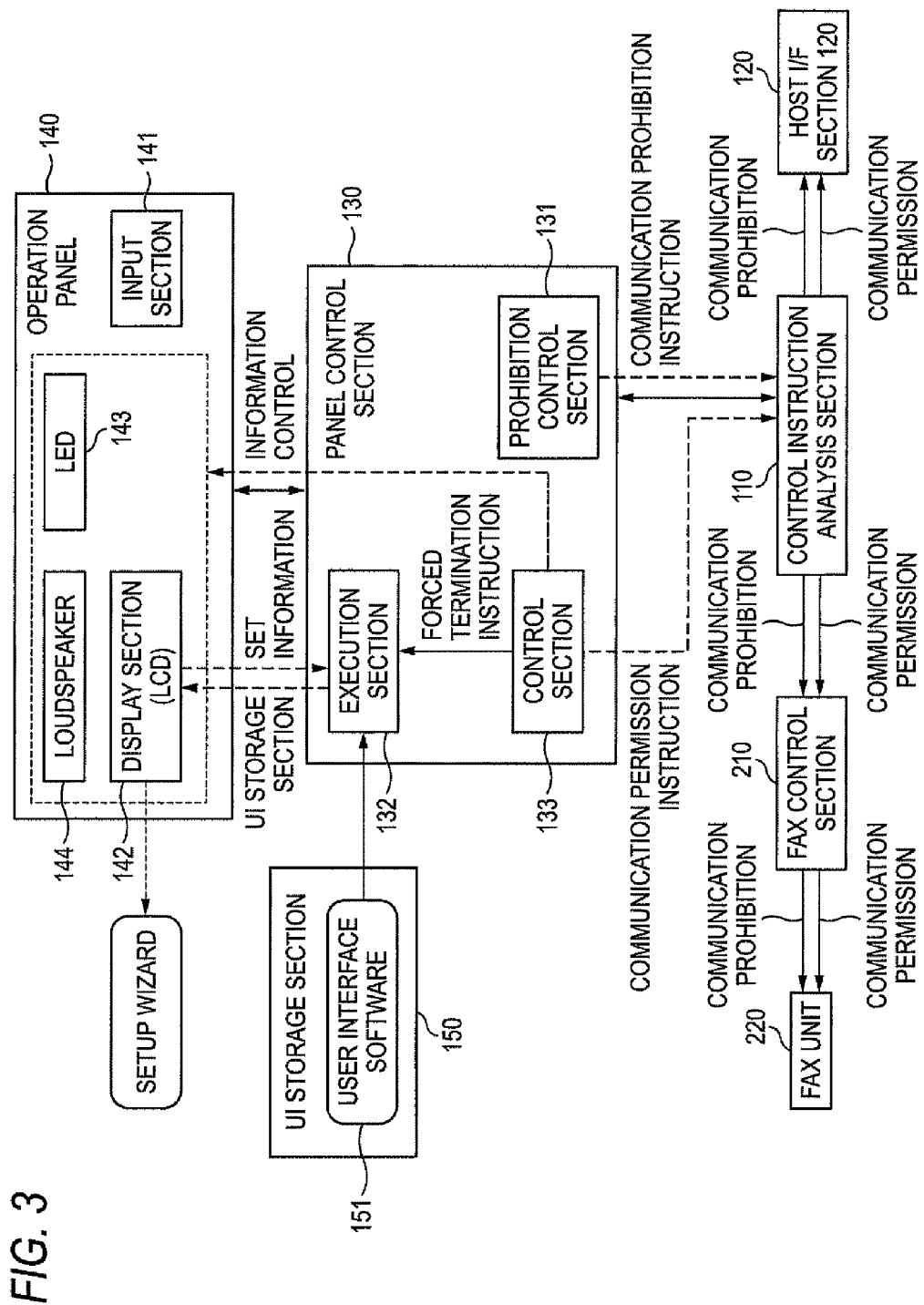
FIG. 3 is a drawing to describe initialization processing of the printer according to the first exemplary embodiment of the invention.

The panel control section 130 has a prohibition control section 131, an execution section 132, and a control section 133, as shown in FIG. 3.

The prohibition control section 131 has a prohibition means function. When execution of initialization concerning the printer (home apparatus) is specified, the prohibition control section 131 prohibits the communication means (the host I/F section 120 and the FAX unit 220) from communicating (outputs a prohibition instruction). The communication prohibition instruction is given to the control instruction analysis section 110 and further is given to the host I/F section 120 and is also given to the FAX unit 220 through the FAX control section 210.

In the Specification, initialization concerning the printer (home apparatus) means introduction setting, namely, setup wizard. Thus, initialization concerning the printer and introduction setting (setup wizard) concerning the printer have the same meaning. In other words, setting of set information for the setup wizard means setting of set information of initialization.

In the description to follow, initialization is described as introduction setting and both of initialization and introduction setting are described as required.

The execution section 132 has an execution means function and executes processing of accepting set information of the introduction setting (initialization) in a state in which communications of the host I/F section 120 and the FAX unit 220 are prohibited.

That is, in a state in which communications of the host I/F section 120 and the FAX unit 220 are prohibited, the execution section 132 reads and executes setup wizard software contained in a user interface software 151 from the UI storage section 150, thereby displaying the setup wizard (setup wizard screen) for executing the initialization as user interface information (UI information) on a display section 142 and accepting set information input to the displayed setup wizard.

The set information accepted by the execution section 132 is stored in the set storage section 170 through the control instruction analysis section 110 and the set management section 160.

The control section 133 has a control means function. When a state in which the set information is not input to the displayed setup wizard exceeds a preset time, the control section 133 controls the apparatus to inform the user that he or she should execute introduction setting (initialization). Specifically, the control section 133 performs information control for the display section 142, an LED 143, and a loudspeaker 144 of the operation panel 140.

When a state in which the set information is not input to the displayed setup wizard exceeds a preset time longer than the above-mentioned preset time, the control section 133 causes the execution section 132 to terminate the processing (outputs a forced termination instruction of the processing) and permits the host I/F section 120 and the FAX unit 220 to communicate (outputs a permission instruction). The communication permission instruction is given to the control instruction analysis section 110 and further is given to the host I/F section 120 and is also given to the FAX unit 220 through the FAX control section 210.

The operation panels 140 has an input section 141 for inputting input information, the display section 142 for displaying display information, the LED 143, and the loudspeaker 144 for producing a beep sound.

The input section 141 inputs specification of execution of introduction setting concerning the printer (home apparatus), set information for the setup wizard screen and a set screen, a processing request of facsimile (FAX) request (FAX transmission request), a scan request, etc., and the like.

The display section 142 is implemented as a liquid crystal display (LCD), for example, and displays display information to prompt the user to perform introduction setting on the setup wizard screen, the setup screen, etc.

The display section 142 informs the user that he or she should execute introduction setting by display of prompting the user to perform introduction setting or blinking or inversion display of display information of prompting the user to perform introduction setting.

The LED 143 informs the user that he or she should execute introduction setting by blinking.

The loudspeaker 144 informs the user that he or she should execute introduction setting by producing a beep sound.

The panel control section 130 outputs input information given from the operation panels 140 to the control instruction analysis section 110 and provides display information for the operation panels 140 under the control of the control instruction analysis section 110 and further informs the user that he or she should execute introduction setting.

The UI storage section 150 stores user interface software 151 for implementing a user interface function containing the setup wizard (setup wizard screen) and a set screen for each function of the FAX function, the scanner function, and the print function.

Figure 4:
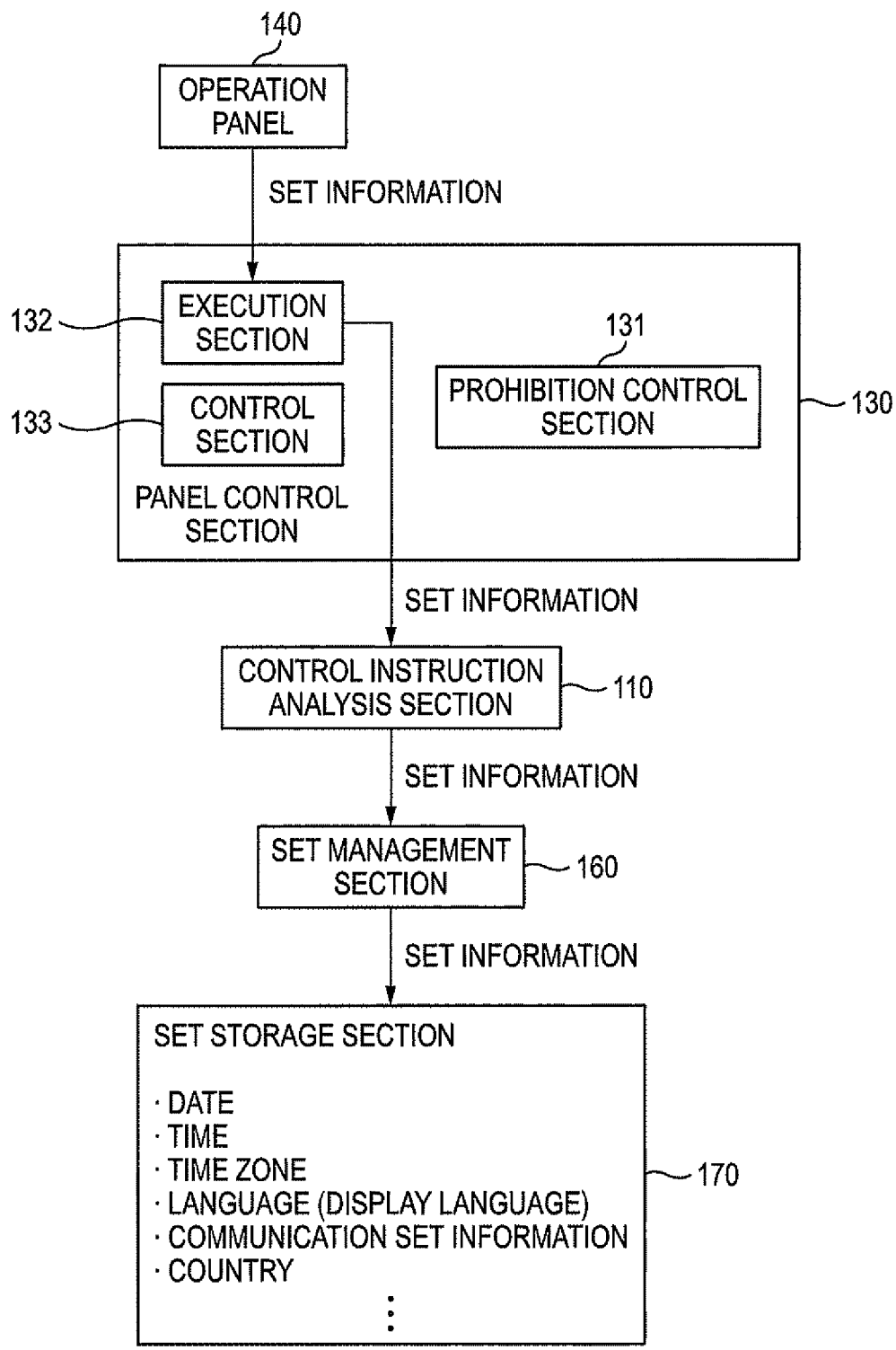
FIG. 4 is a drawing to describe a flow of set information according to the first exemplary embodiment of the invention.

The set management section 160 stores set information output from the execution section 132 of the panel control section 130 and passed from the control instruction analysis section 110 in the set storage section 170, as shown in FIG. 4.

The set storage section 170 has a storage means function and stores set information corresponding to at least one or more set items input by the user among all setup items concerning introduction setting (initialization). As an example of the set items of the introduction setting, set items of date, time, time zone, display language, communication set information (a value concerning communications), a country, etc., may be named.

Referring again to FIG. 2, the description is continued.

Upon reception of print data from the control instruction analysis section 110, the print data control section 180 analyzes a control language for controlling print contained in the print data and converts the print data into a bit map image based on the analysis result and outputs the bit map image to the engine control section 250.

Upon reception of image data (FAX reception data) after decoding processing described later from the control instruction analysis section 110, the print data control section 180 converts the image data into a bit map image and outputs the bit map image to the engine control section 250.

Further, the print data control section 180 stores job history information indicating a history concerning print of a print job in the history information storage section 190.

The history information storage section 190 stores the job history information for each print job.

The FAX control section 210 executes coding processing, decoding processing, etc., of image data. Upon reception of image data (scan data) from the control instruction analysis section 110, the FAX control section 210 executes coding processing for the image data and outputs the image data after subjected to the coding processing to the FAX unit 220. Upon reception of FAX reception data (image data) from the FAX unit 220, the FAX control section 210 executes decoding processing for the FAX reception data (image data) and outputs the image data after subjected to the decoding processing to the control instruction analysis section 110.

The FAX unit 220 conducts facsimile communications in accordance with a facsimile communication procedure through the public line 40.

Upon acceptance of a scan request from the control instruction analysis section 110, the scanner control section 230 controls read of a document for the scanner unit 240 and electronizes image data (scan data) from the scanner unit 240 (executes document format conversion) and outputs the electronic data after subjected to the document format conversion to the control instruction analysis section 110.

Upon acceptance of a FAX transmission request from the control instruction analysis section 110, the scanner control section 230 controls read of a document for the scanner unit 240 and outputs the image data (scan data) from the scanner unit 240 to the control instruction analysis section 110.

The scanner unit 240 has a document bed and an automatic document feeder (ADF), for example, and optically reads a document set on the document bed or fed out from the ADF and converts it into image data (scan data) under the control of the scanner control section 230 and outputs the image data to the scanner control section 230.

Upon reception of a bit map image from the print data control section 180, the engine control section 250 controls the print engine 260 so as to output and print the bit map image.

The print engine 260 forms an image corresponding to the bit map image on a record medium and discharges the record medium (print) on which the image is formed.

Next, introduction setting (initialization) processing of the printer will be discussed with reference to FIG. 5.

When power of the printer is turned on (step S101), the panel control section 130 determines whether or not to start introduction setting (step S102).

At step S102, when the panel control section 130 inquires of the control instruction analysis section 110 whether or not introduction setting is complete, the control instruction analysis section 110 inquires of the set management section 160 whether or not introduction setting is complete, and outputs the answer to the inquiry from the to the panel control section 130. When introduction setting is not complete, it is determined that introduction setting is started.

When it is determined at step S102 that introduction setting is started, the prohibition control section 131 outputs a communication prohibition instruction to the host I/F section 120 and the FAX unit 220 (step S103).

In a state in which communications of the host I/F section 120 and the FAX unit 220 receiving the communication prohibition instruction are prohibited, the execution section 132 reads and outputs setup wizard from the UI storage section 150, thereby displaying the setup wizard (setup wizard screen) to execute the introduction setting as user interface information (UI information) on the display section 141 and accepts set information input to the displayed setup wizard.

The control section 133 starts to count the time of timer 1 of the display section 142, the LED, and beep (step S104) and starts to count the time of timer 2 of timeout (step S105).

Timer 1 counts the time until time T1 has elapsed and on the other hand, timer 2 counts the time until time T2 has elapsed. Here, time T1<time T2. Timer 1 indicates a timer to give caution to the user, and timer 2 indicates a timer to terminate processing as timeout.

The control section 133 determines whether or not input from user exists in response to whether or not any desired button of the input section 141 is pressed (step S106).

When the control section 133 determines that input from the user does not exist because a button is not pressed at step S106, the control section 133 determines whether or not the time count result of timer 1 exceeds the time T1 (step S107).

When the control section 133 determines at step S107 that the time count result of timer 1 does not exceed the time T1, the control section 133 determines whether or not the time count result of timer 2 exceeds the time T2 (step S108).

When the control section 133 determines at step S108 that the time count result of timer 2 does not exceed the time T2, the control section 133 returns to step S106.

When the control section 133 determines at step S107 that the time count result of timer 1 exceeds the time T1, the control section 133 performs information control for at least one element of display (blink) control of the display section 142, blink control of the LED 143, and beep sound control (step S109). Thus, the user is informed that he or she should execute initialization according to display (blink) of the display section 142, blink of the LED 143, and beep sound. When step S109 terminates, the process goes to step S108.

As described above, when the user does not input set information to the setup wizard at the starting time of the printer and for the preset given time, user's attention is directed toward the printer by appealing to vision by display (blink) of the display section 142 and blink of the LED 143 and appealing to the sense of hearing by producing beep sound.

When the control section 133 determines that input from the user exists because a button is pressed at step S106, the control section 133 determines whether or not introduction setting is complete (step S110).

When the control section 133 determines at step S110 that introduction setting is not complete, the control section 133 resets timers 1 and 2 (step S111) and then stops display (blink) of the display section 142 and blink of the LED 143 and producing beep sound as information control (step S112). When step S112 terminates, the process goes to step S106.

When the control section 133 determines at step S108 that the time count result of timer 2 exceeds the time T2 or when the control section 133 determines at step S110 that the introduction setting is complete, the control section 133 outputs a communication permission instruction to the host I/F section 120 and the FAX unit 220 prohibited from communicating through the control instruction analysis section 110 (step S113).

The processing at step S113 means that when the user does not input information to the setup wizard for a given time, it is determined that the user cannot execute introduction setting or need not execute introduction setting, introduction setting processing is terminated by timeout and communications with an external apparatus of the host, etc., are permitted. Accordingly, the printer has the function as a usual printer.

For example, in the printer permitted to conduct communications, when communications are started, the control instruction analysis section 110 executes analysis processing of the communications and performs processing responsive to the result of the analysis processing.

The control instruction analysis section 110 classifies the communication description into any of (1) print data, (2) a control command to check the status of the printer, or (3) a control command to change setting of the printer.

When the communication description is the print data, the control instruction analysis section 110 outputs the print data to the print data control section 180. The print data control section 180 analyzes a control language for controlling print relating to the print data and converts the print data into a bit map image. Then, the bit map image is sent to the print engine 260 through the engine control section 250 and print is executed by the print engine 260.

When the communication description is a control command to check the status of the printer, the control instruction analysis section 110 checks the state of each of the FAX unit 220, the scanner unit 240, and the print engine 260 through the FAX control section 210, the scanner control section 230, and the engine control section 250. Next, the control instruction analysis section 110 transmits the check result to the host of the communication source through the host I/F section 120.

Further, when the communication description is a control command to change setting of the printer, the control instruction analysis section 110 analyzes the printer to be controlled and executes setting change for the printer to be controlled.

As described above, in the first exemplary embodiment, when the user is not familiar with introduction setting in the interactive mode, user's attention is directed toward the user interface attached to the printer, namely, the operation panel 140 or the setup wizard, thereby prompting the user to execute introduction setting.

When the user does not understand introduction setting, the introduction setting processing is timed out, whereby the printer is placed in a state in which it is permitted to communicate with an external apparatus of the host, etc. Accordingly, the printer may be used as usual.

Second Exemplary Embodiment

An image forming system and a printer according to a second exemplary embodiment have similar configurations to the configuration of the image forming system shown in FIG. 1 and the configuration of the printer shown in FIG. 2.

Figure 6:
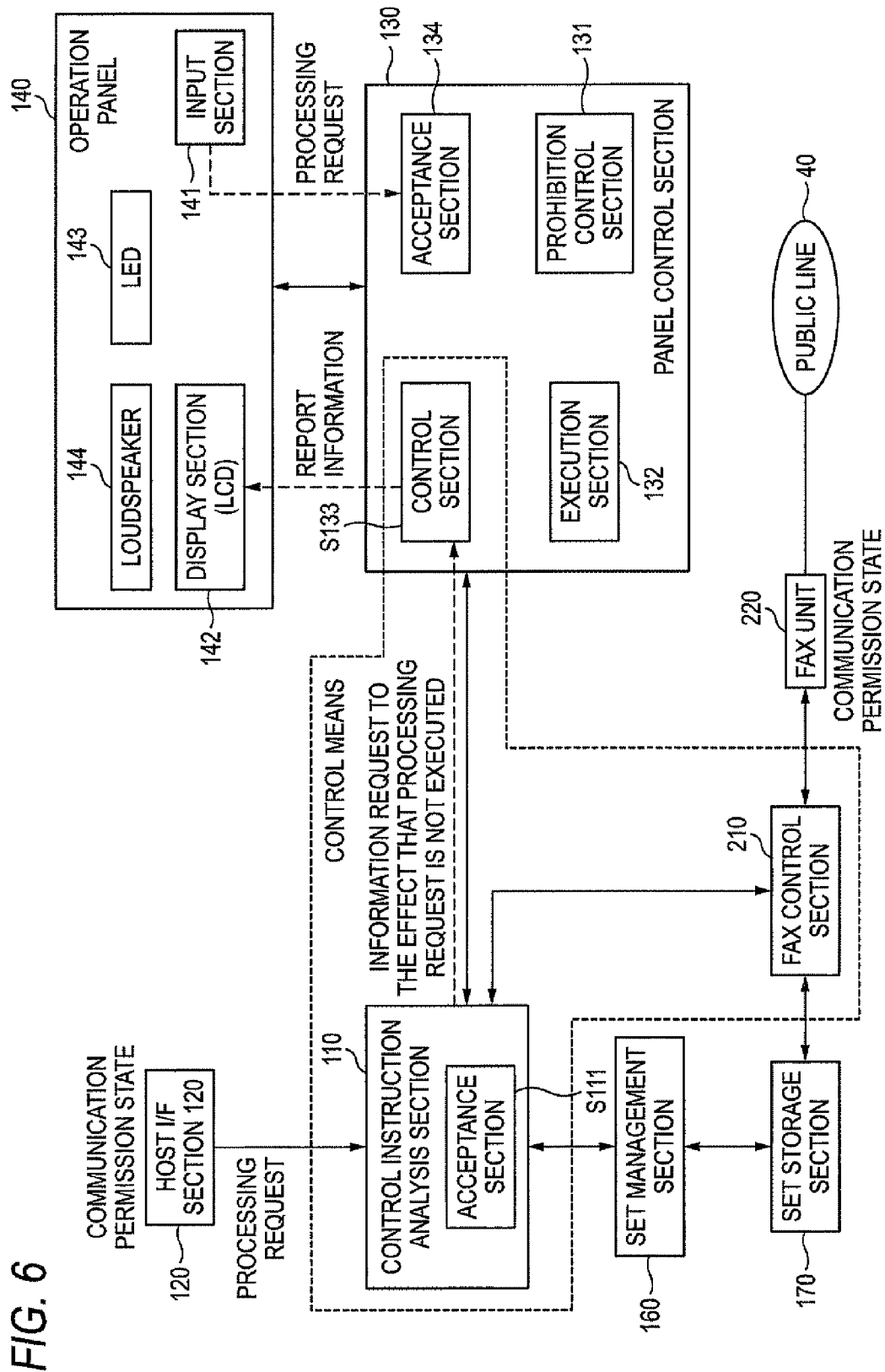
FIG. 6 is a drawing to describe initialization processing of a printer according to a second exemplary embodiment of the invention.

In the printer, as a control instruction analysis section 110, as shown in FIG. 6, an acceptance section 111 is added to the control instruction analysis section 110 shown in FIG. 3 and as a panel control section 130, as shown in FIG. 6, an acceptance section 134 is added to the panel control section 130 shown in FIG. 3.

Each of the acceptance sections 111 and 134 has an acceptance means function and accepts a processing request corresponding to processing using set information corresponding to at least one set item of all set items involved in introduction setting.

As the processing requests, a FAX transmission request, a scan request, a print request, etc., may be named. In this case, the acceptance section 111 accepts the processing request from a host received by a host I/F section 120. The acceptance section 134 accepts the processing request from an operation panel 140.

In the second exemplary embodiment, a FAX control section 210, a scanner control section 230, or an engine control section 250 and a control section 133 of a panel control section 130 and the control instruction analysis section 110 cooperate to provide a control means function.

When set information used in processing responsive to a processing request accepted by the acceptance section 134 or 111 is not stored in a set storage section 170, the control means performs control so as to inform the user that the processing request is not executed.

In the second exemplary embodiment, processing when a FAX country is not set in a setup wizard is described and thus the FAX control section 210, the control section 133 of the panel control section 130, and the control instruction analysis section 110 cooperate to provide the control means function.

Figure 7:
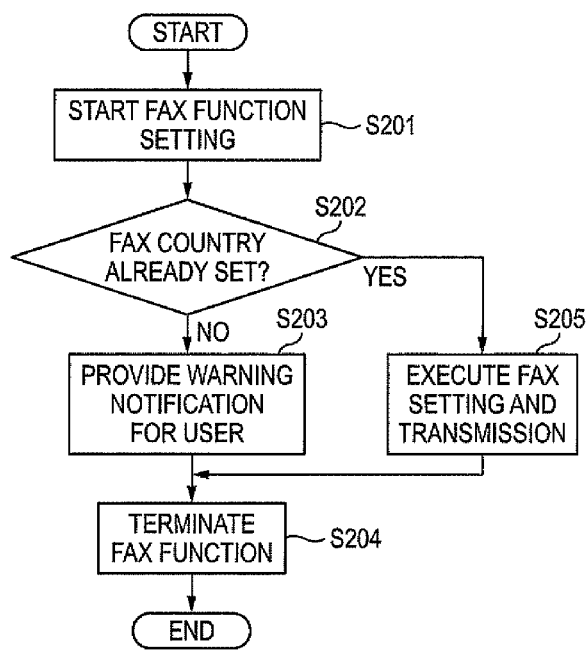
FIG. 7 is a flowchart to show a processing procedure of initialization processing of the printer according to the second exemplary embodiment of the invention.

Next, introduction setting (initialization) processing of the printer will be discussed with reference to FIG. 7.

Figure 5:
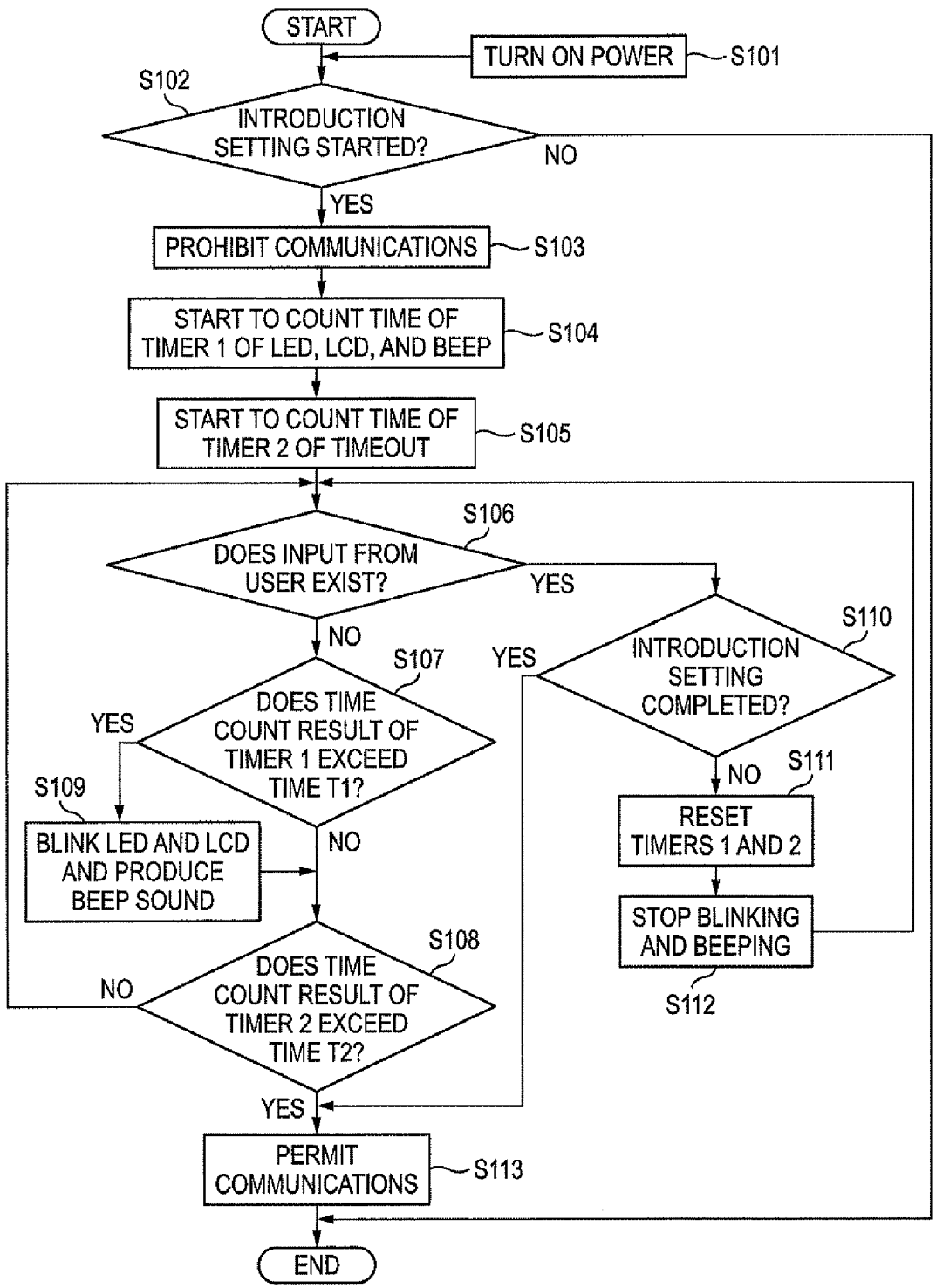
FIG. 5 is a flowchart to show a processing procedure of initialization processing of the printer according to the first exemplary embodiment of the invention.

The introduction setting processing is processing after termination of step S113 in the introduction setting processing of the first exemplary embodiment shown in FIG. 5, namely, is the introduction setting processing of the printer permitted to communicate. Thus, in the example shown in FIG. 6, it is assumed that the host I/F section 120 and a FAX unit 220 are permitted to communicate (in a communication permission state).

When the user sets a transmission document on an original bed of a scanner unit 240 or an automatic document feeder (ADF) to use a FAX function (FAX transmission) and operates the operation panel 140 to give a command of FAX function setting start, namely, a FAX transmission request (processing request) (step S201), the FAX transmission request (processing request) is accepted by the acceptance section 134 of the panel control section 130.

When the acceptance section 134 accepts the FAX transmission request, the control section 133 outputs the FAX transmission request to the FAX control section 210 through the control instruction analysis section 110.

When the FAX control section 210 acquires the FAX transmission request, it determines whether or not set information (FAX country=country information) used in processing responsive to the processing request (FAX transmission request) is stored in the set storage section 170 (whether or not FAX country is set) (step S202).

When the FAX control section 210 determines at step S202 that FAX country is not set, the FAX control section 210 outputs information to the effect that the processing request (FAX transmission request) is not executed to the control section 133 of the panel control section 130 through the control instruction analysis section 110.

Then, the control section 133 informs a display section 142 that the processing request (FAX transmission request) is not executed (warning notification) (step S203).

Specifically, for example, an error message or warning information to the effect that "FAX cannot be used because FAX country is not set" is sent.

In addition to providing the error message or warning information, the user may be notified of a setting method of introduction setting (in the example, FAX country).

After the warning notification is provided at step S203, the FAX control section 210 terminates the FAX function (step S204).

When the FAX control section 210 determines at step S202 that FAX country is set, the FAX control section 210 executes FAX setting and transmission (step S205) and then goes to step S204.

When FAX transmission is executed at step S205, the scanner unit 240 optically reads the document and generates image data. The image data is input to the FAX control section 210 through the scanner control section 230 and the control instruction analysis section 110.

The FAX control section 210 codes the acquired image data and outputs the post-coded image data to the FAX unit 220. The FAX unit 220 transmits the post-coded image data to the destination apparatus by facsimile.

In the second exemplary embodiment, the user operates the operation panel 130 to make a FAX transmission request (processing request) by way of example, but may operate the host to make a FAX transmission request (processing request).

In this case, when the FAX control section 210 determines that FAX country is not set, the FAX control section 210 trams, transmits information to the effect that the processing request (FAX transmission request) is not executed (above-mentioned error message or warning information) to the requesting host through the control instruction analysis section 110 and the host I/F section 120.

As described above, in the second exemplary embodiment, after the setup wizard is timed out, the user is notified of the fact and is prompted to execute initialization by error or warning display, a warning sound produced by a loudspeaker 144, blinking of an LED 143, etc., to prevent invalid operation of a function using uninitialized setting.

Accordingly, the user executes initialization required for using a function using uninitialized setting, thereby using the function normally.

Third Exemplary Embodiment

An image forming system and a printer according to a third exemplary embodiment have similar configurations to those of the second exemplary embodiment (see FIGS. 1, 2, and 6).

In the third exemplary embodiment, a FAX control section 210, a scanner control section 230, or an engine control section 250 and an execution section 132 of a panel control section 130 and a control instruction analysis section 110 cooperate to provide a control means function.

Figure 8:
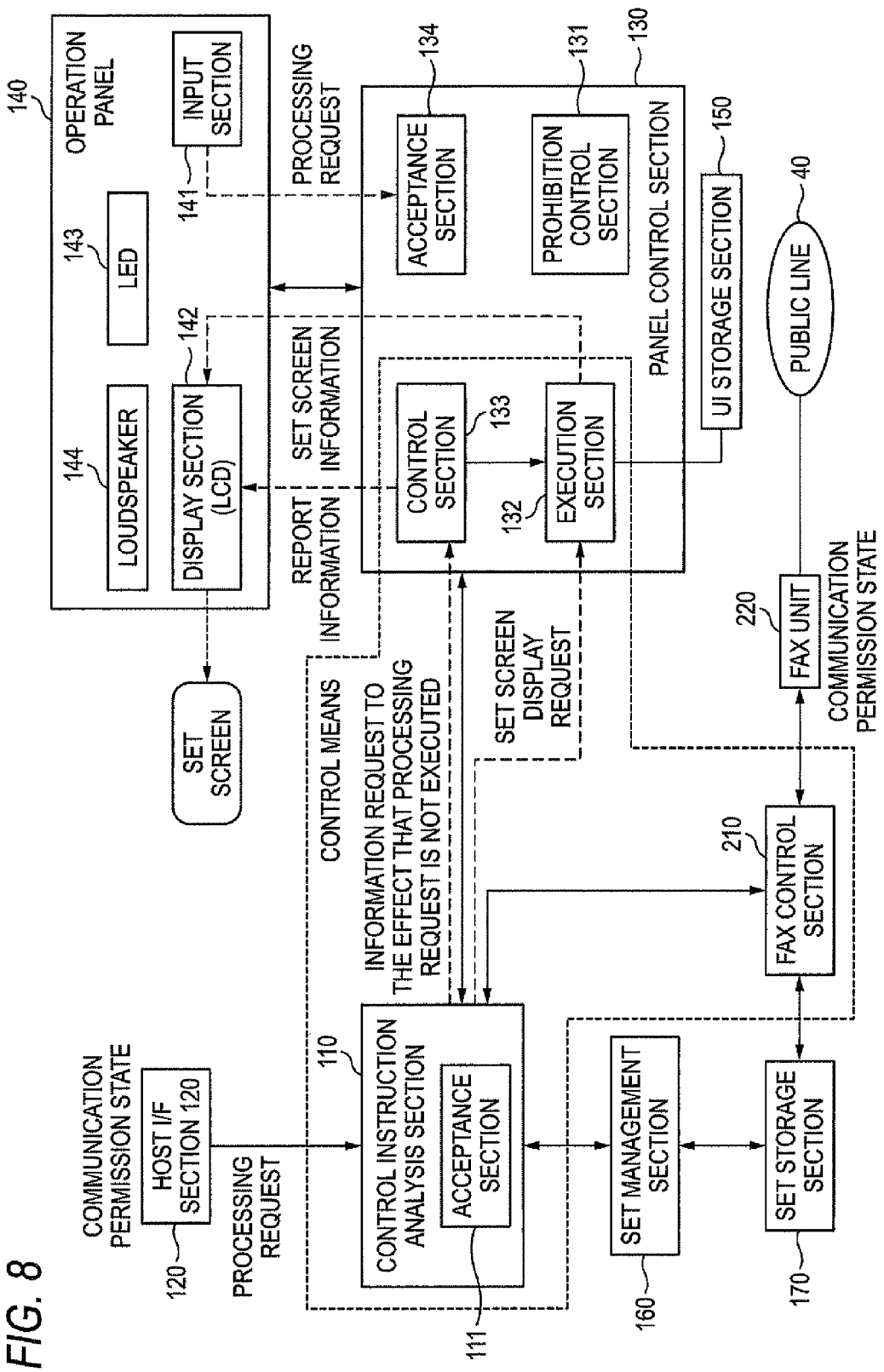
FIG. 8 is a drawing to describe initialization processing of a printer according to a third exemplary embodiment of the invention.

As shown in FIG. 8, when set information used in processing responsive to a processing request accepted by an acceptance section 134 or 111 is not stored in a set storage section 170, the control means performs control so as to display a set screen to set information corresponding to at least one set item of all set items involved in introduction setting.

In the third exemplary embodiment, when FAX country is not set in a setup wizard, processing of setting the FAX country when the user uses FAX is described and thus the FAX control section 210, the execution section 132 of the panel control section 130, and the control instruction analysis section 110 cooperate to provide the control means function.

However, in the third exemplary embodiment, when set information used in processing responsive to a processing request accepted by the acceptance section 134 or 111 is not stored in the set storage section 170, control is also performed so as to inform the user that the processing request is not executed. Thus, the FAX control section 210, the execution section 132 and a control section 133 of the panel control section 130, and the control instruction analysis section 110 cooperate to provide the control means function (see FIG. 8).

Figure 9:
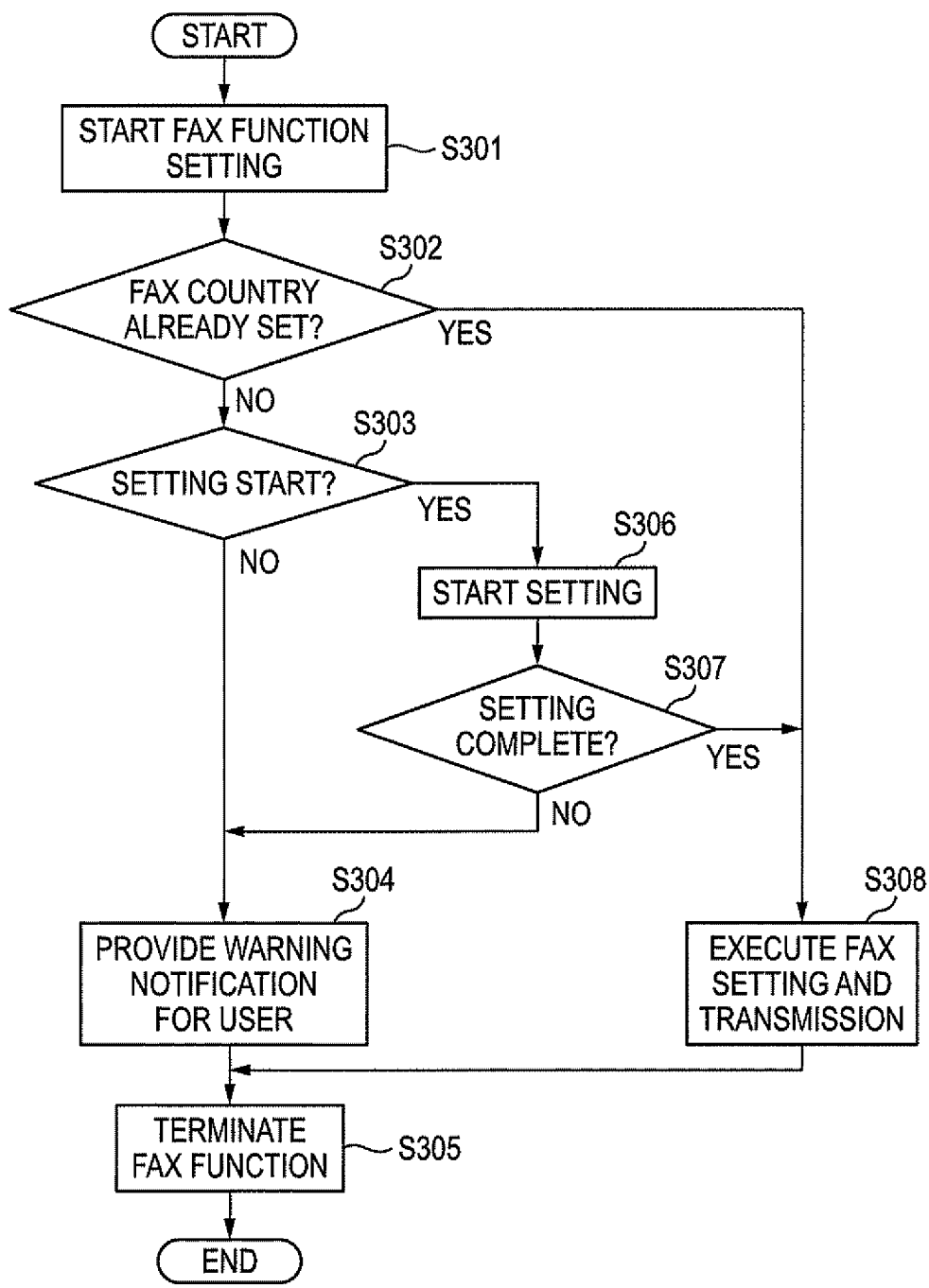
FIG. 9 is a flowchart to show a processing procedure of initialization processing of the printer according to the third exemplary embodiment of the invention.

Next, introduction setting (initialization) processing of the printer will be discussed with reference to FIG. 9.

The introduction setting processing is processing after termination of step S113 in the introduction setting processing of the first exemplary embodiment shown in FIG. 5, namely, is the introduction setting processing of the printer permitted to communicate. Thus, in the example shown in FIG. 8, it is assumed that a host I/F section 120 and a FAX unit 220 are permitted to communicate (in a communication permission state).

When the user sets a transmission document on an original bed of a scanner unit 240 or an automatic document feeder (ADF) to use a FAX function (FAX transmission) and operates the operation panel 140 to give a command of FAX function setting start, namely, a FAX transmission request (processing request) (step S301), the FAX transmission request (processing request) is accepted by the acceptance section 134 of the panel control section 130.

When the acceptance section 134 accepts the FAX transmission request, the control section 133 outputs the FAX transmission request to the FAX control section 210 through the control instruction analysis section 110.

When the FAX control section 210 acquires the FAX transmission request, it determines whether or not set information (FAX country=country information) used in processing responsive to the processing request (FAX transmission request) is stored in the set storage section 170 (whether or not FAX country is set) (step S302).

When the FAX control section 210 determines at step S302 that FAX country is not set, the FAX control section 210 outputs information to the effect that a set screen to set set information corresponding to at least one set item mentioned above is displayed to the execution section 132 of the panel control section 130 through the control instruction analysis section 110.

The execution section 132 displays a menu screen containing a menu corresponding to options of set items containing the FAX country set item and determines whether or not the FAX country set item (option) is selected out of the displayed menu, namely, whether or not to start FAX country setting (step S303).

When the execution section 132 determines at step S303 that FAX country setting is not started because the FAX country set item (option) is not selected, the execution section 132 requests the control section 133 to inform the user that the processing request (FAX transmission request) is not executed.

Then, the control section 133 informs a display section 142 that the processing request (FAX transmission request) is not executed (warning notification) (step S304).

Specifically, for example, an error message or warning information to the effect that "FAX cannot be used because FAX country is not set" is sent.

After warning notification at step S304 is executed, the FAX control section 210 terminates the FAX function (step S305).

When the execution section 132 determines at step S303 that FAX country setting is started because the FAX country set item (option) is selected, the execution section 132 reads FAX country set screen information from a UI storage section and displays the information on the display section 142 and starts to accept set information set for the set screen (step S306).

The execution section 132 determines whether or not the FAX country setting is complete (step S307). When the execution section 132 determines that the FAX country setting is not complete, the execution section 132 requests the control section 133 to inform the user that the processing request (FAX transmission request) is not executed.

Then, the control section 133 informs the display section 142 that the processing request (FAX transmission request) is not executed (warning notification) (see step S304).

When it is determined that the FAX country is not set at step S302 and that FAX country setting is complete at step S307, the FAX control section 210 executes FAX setting and transmission (step S308) and then goes to step S305.

When it is determined that the FAX country is set at step S302, the FAX control section 210 executes FAX setting and transmission (step S308) and then goes to step S305.

When FAX transmission is executed at step S308, the scanner unit 240 optically reads the document and generate image data. The image data is input to the FAX control section 210 through the scanner control section 230 and the control instruction analysis section 110.

The FAX control section 210 codes the acquired image data and outputs the post-coded image data to the FAX unit 220. The FAX unit 220 transmits the post-coded image data to the destination apparatus by facsimile.

As described above, in the third exemplary embodiment, when the user starts setting to use the FAX, when the FAX country is not set, the FAX country set screen is displayed for the user to execute initialization. When the initialization is complete, it is made possible to use the FAX normally.

Fourth Exemplary Embodiment

An image forming system and a printer according to a fourth exemplary embodiment have similar configurations to those of the second exemplary embodiment (see FIGS. 1, 2, and 6).

In the fourth exemplary embodiment, processing when the user makes a job history print request when time setting is not made in a setup wizard is described and thus a print data control section 180, a control section 133 of a panel control section 130, and a control instruction analysis section 110 cooperate to provide a control means function.

Figure 10:
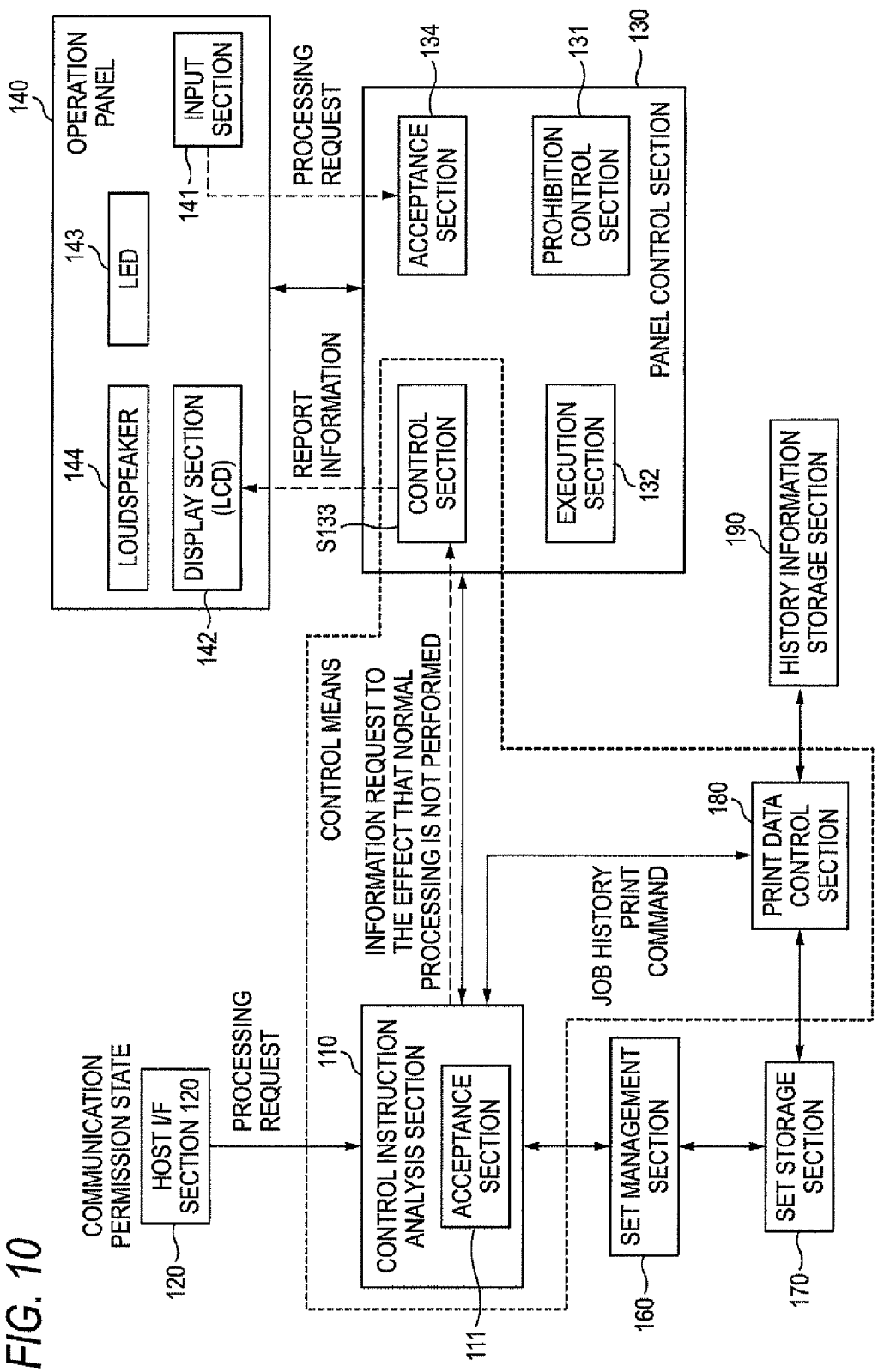
FIG. 10 is a drawing to describe initialization processing of a printer according to a fourth exemplary embodiment of the invention.

When set information (in the example, time information) used in processing responsive to a processing request (in the example, a job history print request) accepted by an acceptance section 134 or 111 is not stored in a set storage section 170, the control means controls so as to inform the user that the processing request is not normally processed, as shown in FIG. 10.

Figure 11:
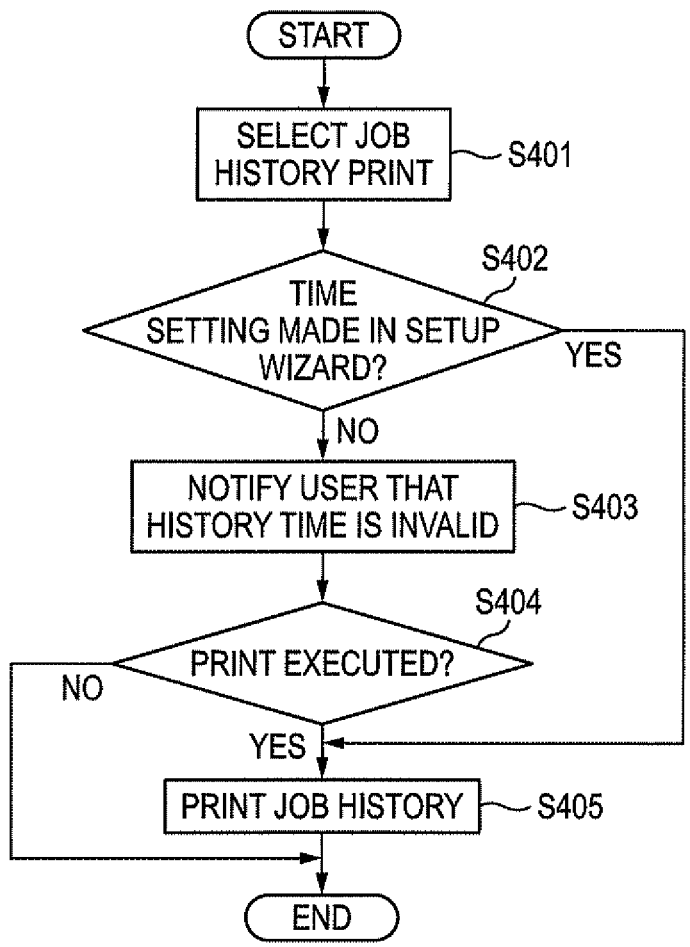
FIG. 11 is a flowchart to show a processing procedure of initialization processing of the printer according to the fourth exemplary embodiment of the invention.

Next, introduction setting (initialization) processing of the printer will be discussed with reference to FIG. 11.

The introduction setting processing is processing after termination of step S113 in the introduction setting processing of the first exemplary embodiment shown in FIG. 5, namely, is the introduction setting processing of the printer permitted to communicate. Thus, in the example shown in FIG. 10, it is assumed that a host I/F section 120 is permitted to communicate. A FAX unit 220 permitted to communicate is omitted.

When the user displays a menu screen containing a menu corresponding to options of items containing a job history print item on a display section 142 by operating an operation panel 140 and then selects the job history print item (step S401), the job history print request (processing request) is accepted by the acceptance section 134 of the panel control section 130.

The job history print request is input to the print data control section 180 through the control instruction analysis section 110.

When the print data control section 180 acquires the job history print request, it determines whether or not time setting is made in the setup wizard, namely, whether or not time information is stored in the set storage section 170 (step S402).

When the print data control section 180 determines at step 3402 that time information is not stored in the set storage section 170, the print data control section 180 outputs information to the effect that the processing request (job history print request) is not normally processed to the control section 133 of the panel control section 130 through the control instruction analysis section 110.

Then, the control section 133 informs the display section 142 that the processing request (job history print request) is not normally processed (step S403). Specifically, for example, the user is informed that "history time is invalid."

The user is warned of the fact that the job history time is invalid because time setting is not made, whereby the user recognizes that there is a function which does not normally operate because initialization is incomplete.

To print the job history whose history time is invalid, the user performs print command operation; not to print the job history, the user performs print cancel command operation.

After information is provided at step S403, the print data control section 180 determines whether or not print of the job history whose history time is executed (step S404).

When it is determined at step S404, print of the job history is executed, print processing of the job history is executed (step S405); on the other hand, when it is determined, print of the job history is not executed, the processing is terminated.

At step S405, the print data control section 180 reads job history information from the history information storage section 190 and converts the job history information into a bit map image and further commands the engine control section 250 to output and print the bit map image. When the engine control section 250 outputs the received bit map image to the print engine 260, the print engine 260 prints an image corresponding to the bit map image, namely, the job history on a record medium. In this case, the history time of the printed job history is invalid.

When it is determined at step S402 that time information is stored in the set storage section 170, the process goes to step S405. In this case, the history time of the printed job history is normal.

As described above, in the fourth exemplary embodiment, the user is warned of the fact that the job history time is invalid because time setting is not made and then the job history is printed, so that the user may recognize that there is a function which does not normally operate because initialization is incomplete. That is, to use a function whose initialization is incomplete, the user is notified that the function normally operates, whereby the user recognizes the fact and is prompted to execute initialization.

In the second to fourth exemplary embodiments described above, when a processing request is made by operation of the host connected to the printer, report information to the effect that the processing request (FAX transmission request) is not executed, that the processing request (job history print request) is not normally processed is transmitted to the host as with the introduction setting (initialization) in the second to fourth exemplary embodiments. In the host, the received report information is provided.

Fifth Exemplary Embodiment

An image forming system and a printer according to a fifth exemplary embodiment have similar configurations to those of the first exemplary embodiment (see FIGS. 1, 2, and 3).

Figure 12:
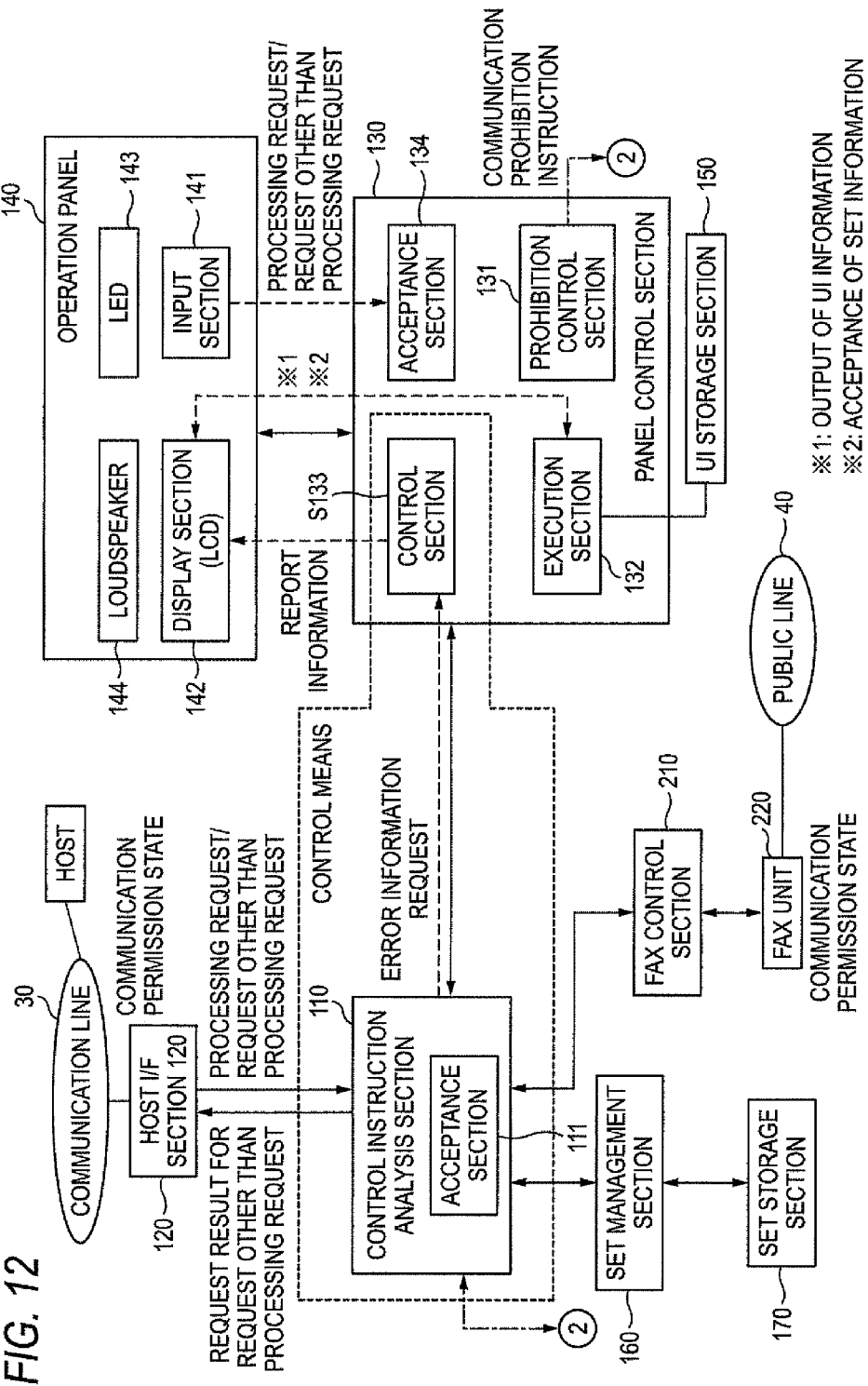
FIG. 12 is a drawing to describe initialization processing of a printer according to a fifth exemplary embodiment of the invention.

In a printer, as a control instruction analysis section 110, as shown in FIG. 12, an acceptance section 111 is added to the control instruction analysis section 110 shown in FIG. 3 and as a panel control section 130, as shown in FIG. 12, an acceptance section 134 is added to the panel control section 130 shown in FIG. 3.

Each of the acceptance sections 111 and 134 has an acceptance means function and accepts a processing request for processing based on set information corresponding to at least one set item of all set items involved in introduction setting.

As the processing requests, a FAX transmission request, a scan request, a print request, etc., may be named. In this case, the acceptance section 111 accepts the processing request from a host received by a host I/F section 120. The acceptance section 134 accepts the processing request from an operation panel 140.

The acceptance section 111 accepts a request other than a processing request and requiring transfer of information by communicating with an external apparatus. As the request other than a processing request, a request for information which becomes necessary for installing a printer driver in the host and a request for checking the state of the printer may be named.

In the fifth exemplary embodiment, a control section 133 of the panel control section 130 and the control instruction analysis section 110 cooperate to provide a control means function.

When the acceptance section 134 or 111 accepts the processing request, when set information corresponding to all set items relating to introduction setting is not stored in a set storage section 170, the control means controls so as to inform the user that introduction setting should be made.

When the acceptance section 134 accepts a request other than the processing request, when set information corresponding to all set items relating to introduction setting is not stored in the set storage section 170, the control means returns the result for the request other than the processing request through the host I/F section 120.

Next, user operation will be discussed with reference to FIG. 13.

The user turns on power of the printer (step S501) and determines whether or not introduction setting of the printer is executed (step S502).

When the power of the printer is turned on at step S501, the control instruction analysis section 110 outputs a communication permission instruction to the host I/F section 120 and a FAX unit 220. Accordingly, the host I/F section 120 and the FAX unit 220 are placed in a communication permission state (step S510).

By the way, when the user determines at step S502 that introduction setting of the printer is executed, the user operates the host and executes introduction setting of the host (step S503) and then operates an operation panel of the printer whose introduction setting is already executed and makes any processing request of a print request, a FAX request, or a scan request (step S504).

Accordingly, the printer executes processing responsive to the processing request, namely, any processing of print, FAX, or scan (step S520). Thus, when introduction setting of the printer is executed and next, introduction setting of the host is executed, when the processing request is made, processing responsive to the processing request is executed normally.

When the user determines at step S502 that introduction setting of the printer is not executed, the user operates the host and executes introduction setting of the host (step S505) and then operates the operation panel of the printer whose introduction setting is not yet executed and makes any processing request of a print request, a FAX request, or a scan request (step S506).

In this case, in the printer, when the acceptance section 134 of the panel control section 130 accepts the processing request made at step S506, the processing request is output to the control instruction analysis section 110.

When the control instruction analysis section 110 acquires the processing request from the panel control section 130, the control instruction analysis section 110 inquires of a set management section 160 whether or not introduction setting is complete, and acquires the answer to the inquiry from the set management section 160.

When set information corresponding to all set items relating to introduction setting (initialization) is not stored in the set storage section 170, the set management section 160 outputs information to the effect that introduction setting is complete to the control instruction analysis section 110. When set information corresponding to all set items is stored in the set storage section 170, the set management section 160 outputs information to the effect that introduction setting is incomplete to the control instruction analysis section 110.

Since the processing request at step S506 is a processing request when the introduction setting of the printer is not executed, information to the effect that the introduction setting is incomplete is output to the control instruction analysis section 110. Upon reception of the information to the effect that the introduction setting is incomplete, the control instruction analysis section 110 sends an error request to the control section 133 of the panel control section 130. Then, the control section 133 informs the display section 142 that the user should execute introduction setting (step S530).

As the information to the effect that that the user should execute introduction setting on the display section 142, error display for prompting the user to execute the introduction setting of the printer may be named. The error display prompts the user to execute the introduction setting.

The user executes the introduction setting of the printer (step S507) and goes to step S504.

That is, when introduction setting of the host (printer driver installation) is executed and next an attempt is made to use the printer in a state in which introduction setting of the printer (setup wizard) is not executed, a message (error message) for prompting the user to execute introduction setting is displayed on the display section 142.

Next, processing responsive to a processing request of the printer will be discussed with reference to FIG. 14.

When the power of the printer is turned on (step S601), in the printer, the control instruction analysis section 110 outputs a communication permission instruction to the host I/F section 120 and the FAX unit 220 so that they are placed in a communication permission state (step S602).

Upon reception of data from the host, the host I/F section 120 in the communication permission state outputs the reception data to the control instruction analysis section 110. The control instruction analysis section 110 accepts the reception data from the host I/F section 120.

The operation description responsive to operation of an input section 141 of the operation panel 140 by the user is given to the panel control section 130. When the acceptance section 134 accepts the operation description, the panel control section 130 outputs the operation description to the control instruction analysis section 110.

The control instruction analysis section 110 determines whether or not the reception data accepted by the acceptance section 111 or the operation description from the panel control section 130 is a request for any operation of scan, FAX, or print (processing request) (step S603).

When the control instruction analysis section 110 determines at step S603 that the reception data or the operation description is the processing request, the control instruction analysis section 110 inquires of the set management section 160 whether or not introduction setting is complete, and determines whether or not introduction setting is already executed in response to the inquiry result from the set management section 160 to the inquiry.

When the control instruction analysis section 110 determines at step S604 that introduction setting is already executed, the control instruction analysis section 110 outputs the processing request determined at step S603 to the scanner control section 230, the FAX control section 210, or a print data control section 180 for executing processing responsive to the processing request (step S605).

That is, when the processing request is a scan request, the control instruction analysis section 110 outputs the request to the scanner control section 230; when the processing request is a FAX request, the control instruction analysis section 110 outputs the request to the FAX control section 210, and when the processing request is a scan request, the control instruction analysis section 110 outputs the request to the print data control section 180.

The scan operation (scan processing) is executed as the scanner control section 230 receives the scan request (step S606), the FAX operation (FAX processing) is executed as the FAX control section 210 receives the FAX request (step S607), and the print operation (print processing) is executed as the print data control section 180 receives the print request (step S608).

When the control instruction analysis section 110 determines at step S604 that introduction setting is not yet executed, the control instruction analysis section 110 outputs an error request to the control section 133 of the panel control section 130. Then, the control section 133 displays information to the effect that the user should execute introduction setting, for example, an error message to the effect that introduction setting is not executed or a message for requesting the user to execute introduction setting on the display section 142 of the operation panel 140 (step S609).

When the control instruction analysis section 110 determines at step S603 that the reception data or the operation description is the processing request mentioned above, the control instruction analysis section 110 determines that the reception data or the operation description is a request other than the processing request, and returns the result for the request to the host making the request other than the processing request (S610).

As the request other than the processing request, for example, a request for checking the status of the printer from the host making the request may be named. Specifically, the request is given to the control instruction analysis section 110 as a control command for checking the status of the printer.

When the control instruction analysis section 110 acquires the control command for checking the status of the printer, the control instruction analysis section 110 returns a response responsive to host I/F protocol, a plug and play response, and a response to inquiry about Mib (Management Information Base) and device ID information to the requesting host.

Upon reception of the description of the responses, the requesting host installs the printer driver based on the description of the responses.

By the way, when introduction setting is complete, the control instruction analysis section 110 executes analysis processing of the communication description and performs processing responsive to the result of the analysis processing according to communication start or any request of print, FAX, or scan from the operation panel 140.

That is, the control instruction analysis section 110 classifies the communication description into (1) any request of print, FAX, or scan, (2) control command for checking the status of the printer, and (3) control command for changing setting of the printer.

When the communication description is any request of scan, FAX, or print, the control instruction analysis section 110 controls any of the FAX control section 210, the scanner control section 230, or the print data control section 180 to execute processing responsive to any request of scan, FAX, or print.

When the communication description is a control command for checking the status of the printer, the control instruction analysis section 110 checks the state of each of the FAX unit 220, the scanner unit 240, and the print engine 260 through the FAX control section 210, the scanner control section 230, and the engine control section 250. Next, the control instruction analysis section 110 transmits the check result to the host of the communication source through the host I/F section 120.

The control described above becomes effective as communications are permitted.

In contrast, when any request of scan, FAX, or print is made in a state in which introduction setting is not made, to inform the user that introduction setting is not made, when the communication description is any request of scan, FAX, or print, an error message to the effect that introduction setting is not made is displayed on the display section 142 of the operation panel 140 as the user interface (hardware).

However, since communication processing is not shut out, a response is made to the control command for checking the status of the printer and thus introduction work of the host (printer driver installation) is executed. When introduction setting of the printer (setup wizard) is not executed, introduction setting of the host (printer driver installation) may be executed in advance.

Figure 13:
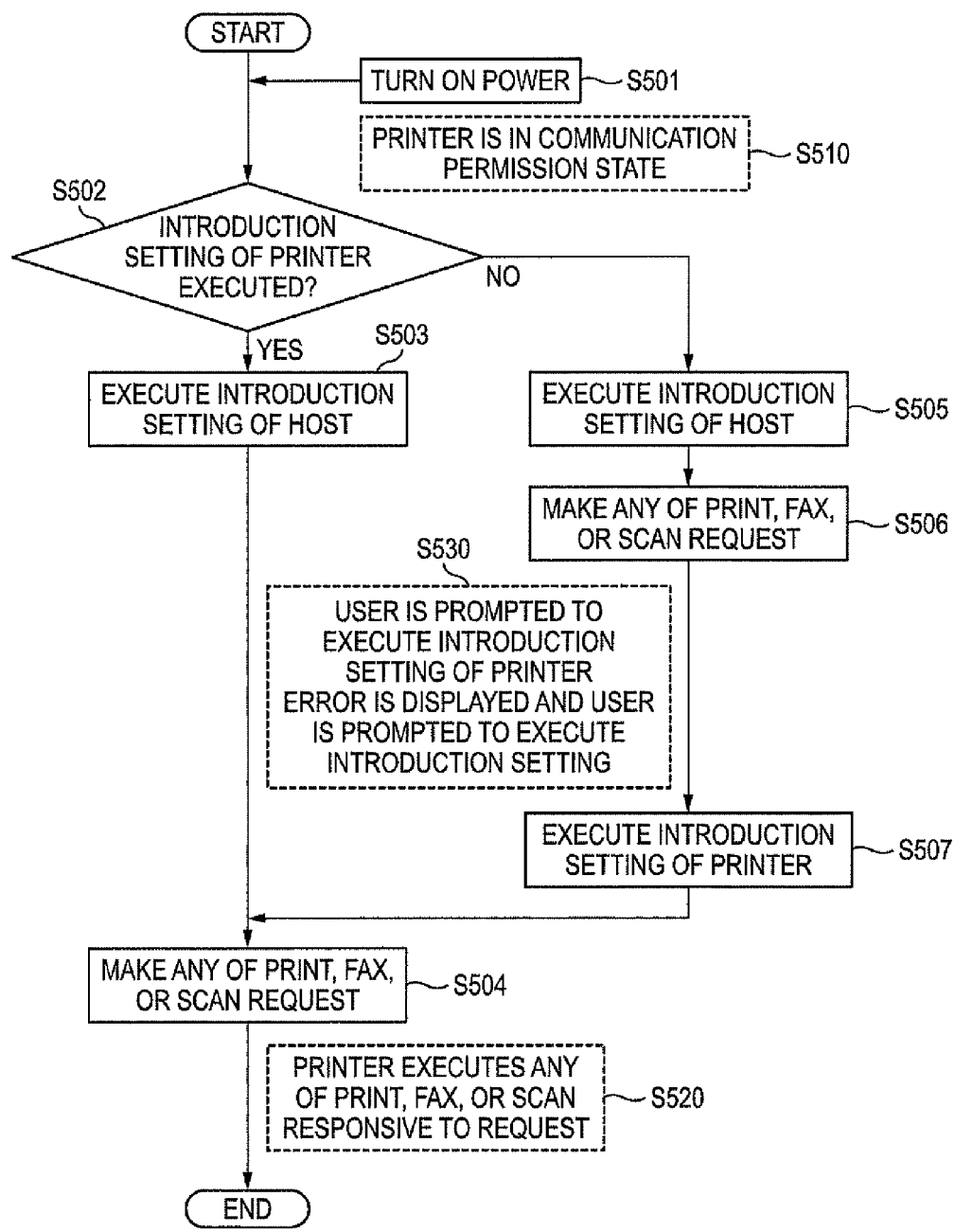
FIG. 13 is a flowchart to show a procedure of user operation according to the fifth exemplary embodiment of the invention.
Figure 14:
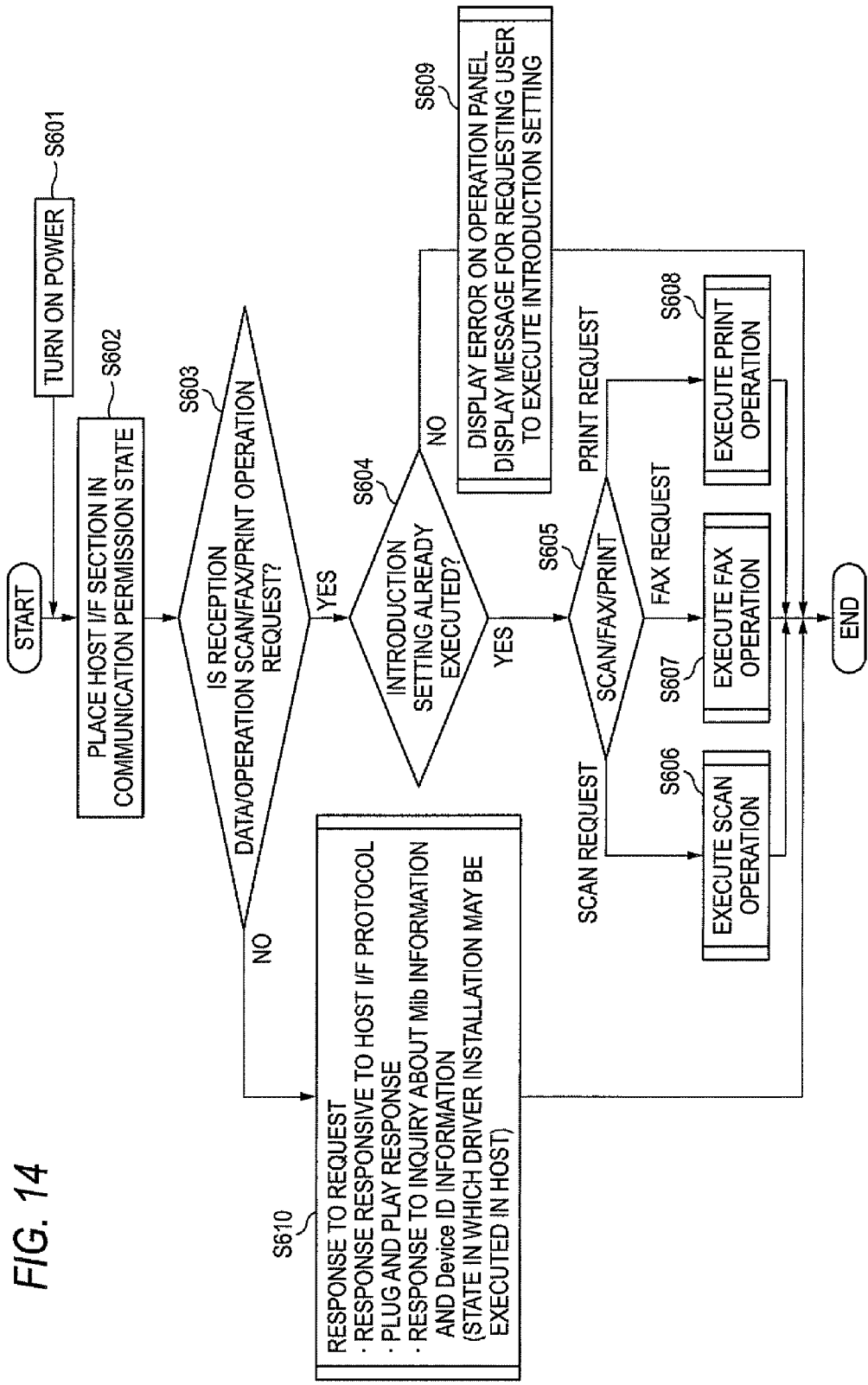
FIG. 14 is a flowchart to show a processing procedure of processing responsive to a request by the printer according to the fifth exemplary embodiment of the invention.

In the fifth exemplary embodiment, as processing responsive to the user operation shown in FIG. 13 and the processing request of the printer shown in FIG. 14, processing when the host I/F section 120 and the FAX unit 220 become a communication permission state after the power of the printer is turned on is described, but the processing is not limited to it and the following may be performed:

Processing after step S113 terminates in the introduction setting processing of the first exemplary embodiment shown in FIG. 5, namely, processing responsive to the user operation and processing request about the printer making a transition from the communication prohibition state to the communication permission state may be executed. In this case, step S501 is deleted in the processing procedure in FIG. 13 and steps S601 and S602 are deleted in the processing procedure in FIG. 14.

As described above, in the fifth exemplary embodiment, the user may execute introduction setting without any problem regardless of which of introduction setting of the printer (setup wizard) and introduction setting of the host (printer driver installation) is started earlier. Thus, when the user starts introduction setting of the host (printer driver installation) is started earlier, the user is not at a loss.

When only introduction setting of the host is executed and the printer is used without executing introduction setting of the printer, an error message indicating that introduction setting is incomplete is displayed on the operation panel, to that the user is clearly prompted to execute introduction setting.

Further, an error message for prompting the user to execute introduction setting of the printer is displayed until the introduction setting is performed normally (the introduction setting is complete), so that evaluation items in the manufacturer at the product developing time are reduced. In this connection, illegal operation check when the printer is operated with insufficient setting, the number of evaluation items increases to $2^N$ where N is the number of set items.

By the way, in a printer having introduction setting for smoothly executing initialization (setup wizard) not having the configuration of the printer according to any of the first to fifth embodiments described above, external communications may be shut out to prevent the printer from malfunctioning because print data, FAX data, printer setting change request data, etc., is transmitted from the outside while initialization is executed.

On the other hand, however, when initialization with the setup wizard of the printer cannot be executed because the user insufficiently recognizes it, when communications remain shut out, communications with the host cannot be conducted and thus installation of the printer driver on the host side, etc., cannot be executed.

In this connection, when such an event occurs, the user has a misunderstanding that communications with the host cannot be conducted because of a product failure.

Next, the hardware configuration of the printer according to the first exemplary embodiment will be discussed with reference to FIG. 15.

Figure 15:
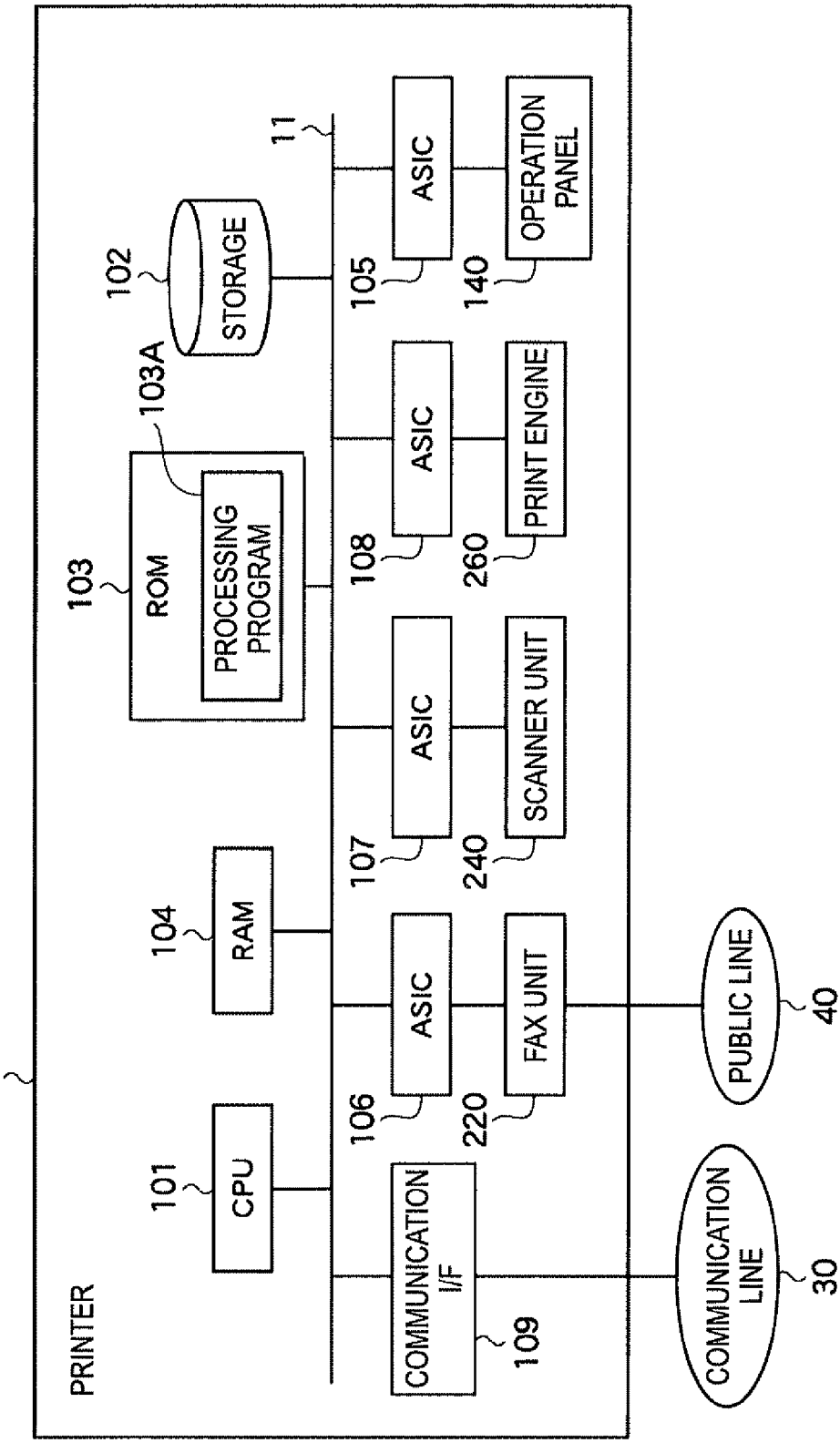
FIG. 15 is a block diagram to show the hardware configuration of printer according to the first exemplary embodiment of the invention.

The printer 10 (10#1 to 10#n) has a CPU 101, storage 102, ROM 103, RAM 104, ASICs 105 to 108, a communication I/F 109, an operation panel 140 connected to the ASIC 105, a FAX unit 220 connected to the ASIC 106, a scanner unit 240 connected to the ASIC 107, and the printer engine 260 connected to the ASIC 108 as shown in FIG. 15. The components 101 to 109 are connected to a system bus 11.

The storage 102 is, for example, a hard disk and stores software (programs) to implement the functions of the control instruction analysis section 110, the set management section 160, and the print data control section 180 shown in FIG. 2. The function of the control instruction analysis section 110 contains the function of the acceptance section 111 shown in FIG. 6.

The storage 102 provides the functions of the set management section 160 and the history information storage section 190 shown in FIG. 2.

The ROM 103, which is read-only memory, stores various installed programs of communication protocol information for conducting data communications with external apparatus, user interface software 151 (see FIG. 3), a processing program 103A, etc. The ROM 103 provides the function of the UI storage section 150 shown in FIG. 2.

The processing program 103A contains software (program) for implementing the function of the panel control section 130 shown in FIG. 3. The function of the panel control section 130 contains the functions of the prohibition control section 131, the execution section 132, and the control section 133. The prohibition control section 131 executes a prohibition processing process, the execution section 132 executes an execution processing process, and the control section 133 executes a control processing process.

The RAM, which is random access memory, stores a program and data read from the storage 102, the communication protocol information, the processing program 102A, the user interface software 151, etc., read from the ROM 103.

The RAM 104 stores data transmitted and received through the host I/F section 120, for example.

The ASIC 105, which is application-specific integrated circuit, provides the function of the panel control section 130 shown in FIG. 2. The operation panel 150 is connected to the ASIC 105 through an interface (not shown).

The ASIC 105 reads the processing program 103A from the ROM 103 to the RAM 104 and executes the program, thereby implementing the functions of the prohibition control section 131, the execution section 132, and the control section 133 and also implementing the processing function corresponding to the processing program 103A.

The ASIC 106, which is application-specific integrated circuit, provides the function of the FAX control section 210 shown in FIG. 2. The FAX unit 220 is connected to the ASIC 106 through an interface (not shown).

The ASIC 107, which is application-specific integrated circuit, provides the function of the scanner control section 230 shown in FIG. 2. The scanner unit 240 is connected to the ASIC 107 through an interface (not shown).

The ASIC 108, which is application-specific integrated circuit, provides the function of the engine control section 250 shown in FIG. 2. The printer engine 260 is connected to the ASIC 108 through an interface (not shown).

The communication I/F 109 includes a CPU (central processing unit) for executing data communications and corresponds to the host I/F section 120 shown in FIG. 2. The communication I/F 109 reads protocol information from the ROM 103 to the RAM 104 and executes the information, thereby conducting data communications with the host of the destination, for example, through the communication line 30.

The CPU 101, which is a central processing unit, reads a program from the storage 102 to the RAM 104 and executes the program, thereby implementing the functions of the control instruction analysis section 110, the set management section 160, and the print data control section 180 described above. The CPU 101 controls the whole printer.

Although the invention of the inventors has been specifically described based on the exemplary embodiments, it is to be understood that the exemplary embodiments disclosed in the Specification are all illustrative and are not limited to the disclosed arts. That is, the technical scope of the invention is not interpreted restrictively based on the description of the exemplary embodiments and should be interpreted according to the claims and equivalent arts to the arts claimed in the claims and all changes without departing from the sprit and the scope of the claims are contained.

To use a program, the program may be provided through the network or may be stored in a storage medium of a CD-ROM, etc., and be provided.

That is, the programs including the processing program are not limited to the case where the programs are recorded in ROM and may be provided as follows:

For example, the programs including the processing program may be previously stored in storage of a hard disk, etc., and the CPU may load the program from the storage into main storage for execution.

The programs may be stored in a computer-readable storage medium of a DVD-ROM, a CD-ROM, an MO (magneto-optical disk), a flexible disk, etc., for distribution.

Further, the printer, etc., may be connected to a server or a host computer through a communication line (for example, the Internet) and the program may be downloaded from the server or the host computer and then may be executed. In this case, the program may be downloaded into memory of RAM, etc., and storage (storage medium) of a hard disk, etc.

INDUSTRIAL APPLICABILITY

The image forming system of the invention may be applied to an image forming system wherein an image forming apparatus and a communication apparatus are connected locally.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a communication unit that communicates with an external apparatus;
a prohibition unit that prohibits the communication unit from communicating with the external apparatus when a command for executing initialization with respect to the image forming apparatus is specified;
an execution unit that executes a process for accepting set information of the initialization when the prohibition unit prohibits the communication unit from communication with the external apparatus;
a control unit that executes a process for informing that the initialization should be executed when an elapsed time of a waiting state where input of the set information is not executed exceeds a given period, wherein the control unit informs a user to execute initialization using a display system;
a storage unit that stores the set information accepted by the execution unit; and
an acceptance unit that accepts a processing request corresponding to a process using a given piece of the set information, the given piece relating to at least one set item of set items in the initialization,
wherein the control unit terminates the process executed by the execution unit and permits the communication unit to communicate with the external apparatus when the elapsed time of the waiting state exceeds a preset period longer than the given period, and the control unit executes a process for informing that the processing request is not executed when the given piece of the set information is not stored in the storage unit.

2. The image forming apparatus according to claim 1, wherein the control unit executes a process for displaying a set screen to set the given piece of the set information when the given piece of the set information is not stored in the storage unit.

3. The image forming apparatus according to claim 1, wherein the control unit executes a process for informing that the processing request is not normally processed when the given piece of the set information is not stored in the storage unit.

4. The image forming apparatus according to claim 1 further comprising an acceptance unit that accepts a processing request corresponding to a process using a given piece of the set information, the given piece relating to at least one set item of all set items in the initialization,
wherein the control unit executes a process for informing that the initialization should be executed when the acceptance unit accepts the processing request and the set information corresponding to all set items is not stored in the storage unit.

5. The image forming apparatus according to claim 4, wherein the acceptance unit accepts a given request requiring transfer of information by communicating with the external apparatus except the processing request, and
the control unit returns the result for the given request through the communication unit when the acceptance unit accepts the given request and the set information corresponding to all set items is not stored in the storage unit.

6. An image forming apparatus having:
a communication unit that has a permitted state where the communication unit is permitted to communicate with external apparatus and a prohibited state where the communication unit is prohibited from communication with the external apparatus;
an execution unit that executes processing for accepting set information of initialization with respect to the image forming apparatus when the communication unit is in the prohibited state;
a storage unit that sores the set information accepted by the execution unit;
an acceptance unit that accepts a processing request corresponding to a process using a given piece of the set information, the given piece relating to at least one set item of all set items in the initialization,
a control unit that executes a process for informing that the initialization should be executed when the acceptance unit accepts the processing request and the set information corresponding to all set items is not stored in the storage unit.

7. The image forming apparatus according to claim 6, wherein the acceptance unit accepts a given request requiring transfer of information by communicating with the external apparatus except the processing request, and
the control unit returns the result for the given request through the communication unit when the acceptance unit accepts the given request and the set information corresponding to all set items is not stored in the storage unit.

8. An image forming apparatus comprising:
a communication unit that communicates with an external apparatus;
a prohibition unit that prohibits the communication unit from communicating with the external apparatus when a command for executing initialization with respect to the image forming apparatus is specified;
an execution unit that executes a process for accepting set information of the initialization when the prohibition unit prohibits the communication unit from communication with the external apparatus;
a control unit that executes a process for informing that the initialization should be executed when an elapsed time of a waiting state where input of the set information is not executed exceeds a given period,
wherein the control unit terminates the process executed by the execution unit and permits the communication unit to communicate with the external apparatus when the elapsed time of the waiting state exceeds a preset period longer than the given period;
a storage unit that stores the set information accepted by the execution unit; and
an acceptance unit that accepts a processing request corresponding to a process using a given piece of the set information, the given piece relating to at least one set item of set items in the initialization,
wherein the control unit executes a process for informing that the processing request is not executed when the given piece of the set information is not stored in the storage unit.

* * * * *